March 18, 1947. J. G. BRYANT, JR 2,417,467
PULLEY MOUNTING
Filed Oct. 14, 1943
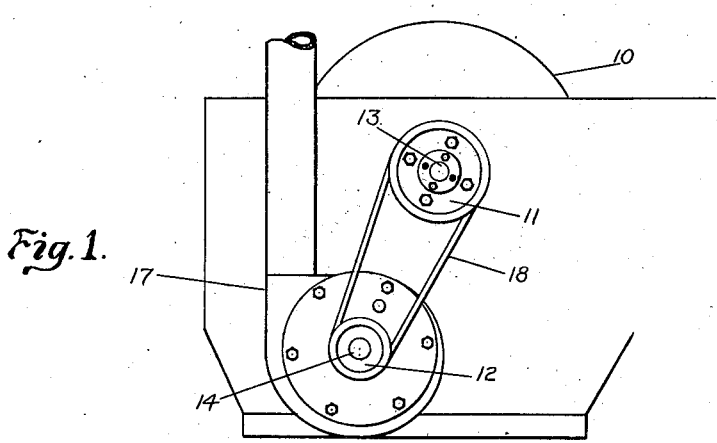
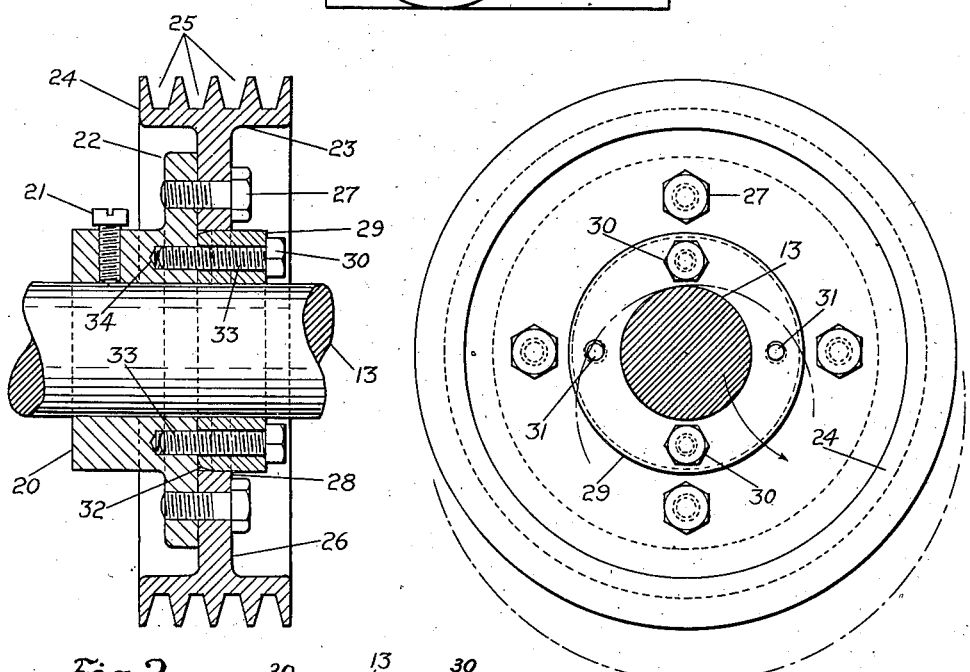
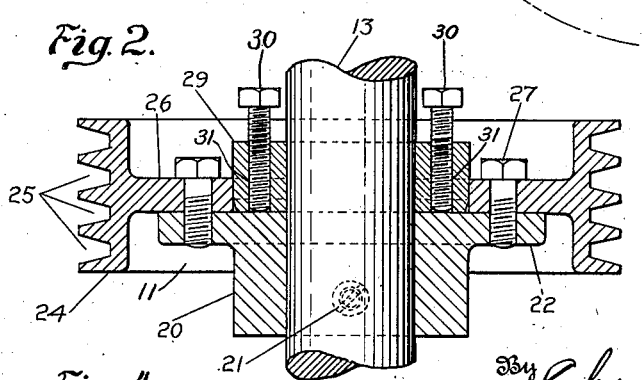
Inventor
James Graham Bryant, Jr.
By Christian R. Nielsen
Attorney Patented Mar. 18, 1947

2,417,467

UNITED STATES PATENT OFFICE 2,417,467

PULLEY MOUNTING

James G. Bryant, Jr., Port Huron, Mich.

Application October 14, 1943, Serial No. 506,251

2 Claims. (Cl. 74—230.1)

1

The invention has for an object to provide a simple and low cost mounting by which belts may be put in place upon pulleys and displaced without removing the pulley from around the shaft, and the invention is particularly valuable and important in the removal and replacement of belts on flanged pulleys. In the removal and replacement of V-belts from pulleys, where the belt has to be run over the edges of the pulley, much strain and damage is done to the belt, the fibers being broken and the structure of the belt bruised where it engages the flange of the pulley in removal, and it is consequently an important aim of my invention to enable the pulley body to be moved translatively into an eccentric relation to the shaft so that the reach of the belt thereto is shortened and the belt may be removed without tension.

It is also an important object to largely eliminate the laborious effort heretofore required in changing belts upon such pulleys.

The invention is of special value in the case of multiple grooved pulleys, where two, three, or more belts are engaged commonly between two pulleys which have a corresponding number of grooves to receive them.

While I am aware that attempts have been made to effect construction whereby pulleys may be moved out of axial relation to the supporting shaft, many of these devices are unsatisfactory because of the difficulty of securing accurate alinement of the pulley, and of bringing the pulley body into concentric relation to the shaft upon which it is mounted, while others are objectionable in the complexity of their manufacture, or lack of rugged strength, or difficulty of manipulation, as well as other causes.

It is therefore an air of my invention to present a pulley in which the elements will function in a novel way for the attainment of quick loosening of the belt and replacement, extremely accurate centering of the pulley body on the shaft, great ease in use of the device for loosening of the belt and replacing of the pulley in proper position after installation of new belts, rugged construction, liable in a minimum degree to derangement and damage incident to severe use and retention of all the advantages of grooved pulleys for the uses for which they are applied.

It is an especial aim of the invention to enable the production of all the necessary parts in an extremely simple form involving no departure from conventional production procedure and few machine operations.

Additional objects, advantages and features of invention reside in the construction, arrangement and combination of parts involved in the embodiment of the invention, as will be more readily understood from the following description and accompanying drawings, wherein Figure 1 is an elevational view of a belt-driven apparatus, in which my invention is incorporated, Figure 2 is a cross sectional view of the pulley mounted upon a shaft, Figure 3 is an elevational view of the pulley, looking along its axis.

Figure 4 is a view similar to Figure 2, in a horizontal plane showing the centering member in course of displacement.

There is illustrated in Figure 1, a machine 10 which may be of any conventional construction involving upper and lower pulleys 11 and 12, mounted on shafts 13 and 14, respectively, for communicating driving force from one to the other. In the present instance, the shaft 14 is mounted in the case 17 of a conventional blower or other apparatus.

The pulley 11 comprises a hub body 20, having a snug fit upon the shaft 13, and adapted to be keyed or otherwise secured upon the shaft, a set screw 21 being shown in the present instance. At one end of the hub, a planiform flange 22 is formed integrally thereon, the outer or end face extending from the periphery of the flange to the shaft and at right angles to the shaft. A pulley body 23 is provided, consisting of a substantially cylindrical rim 24 of substantial radial thickness, and formed with a plurality of V-grooves 25 of conventional form. Within the rim a web portion 26 is formed integrally with the rim, this web having a planiform face at the side next the flange 22 of the hub, and being secured tightly thereto by a suitable number of bolts 27 engaged therethrough, and screwed into suitably threaded openings in the flange 22, by which the web 26 is clamped tightly against the flange 22 and held against loose movement.

In order to sustain the stresses involved on the pulley by belt tension, and due to the fact that the hub 20 extends in one direction only from the web 26, the rim 24 may be projected more in the direction of the hub 20 than at the opposite side, or may be extended entirely in the one direction, this being an obvious expedient not illustrated.

The web 26 is formed with a coaxial opening 28 therethrough, which is smoothly finished, and is intended to be concentric with the shaft 13. Fitted in this opening, and slidably upon the shaft 13, there is a centering ring 29, the dimension of which longitudinally of the shaft is substantially greater than the thickness of the web 26, in the present instance the length of this ring being approximately twice the thickness of the web 26. It is securely clamped against the hub 20 within the opening 28 by means of a number of bolts 30 screwed into suitably threaded holes in the adjacent end of the hub 20. The bolts 30 are preferably threaded completely to their head portions, as shown, for a reason to be explained, but have no threaded engagement with the openings through the ring 29, being slidable through the last mentioned openings. The number of bolts 30 may be less than the number of bolts 27, as will be readily appreciated subsequently, and preferably include but few, in order to leave an opportunity to provide additional openings in the ring 29 not aligned with openings in the hub 20, the threaded openings in the ring 29 being shown at 31 and being at least two in number, and of a size to fit the bolt 30, so that the latter after being withdrawn from engagement in the ring and hub 20 may be screwed into the openings 31 and against the hub 20 behind the ring to press the ring away from the hub and clear of the opening 28, the bolt 30 being of a length sufficiently greater than the length of the ring 29 to effect this degree of movement.

The periphery of the ring 29 at the end next the hub 20 and adjacent the flange 26 is chamfered, as shown at 32, so as to afford a slight taper for a distance less than the thickness of the web 26, whereby to facilitate entry of the ring 29 into the opening 28 in course of replacement of the pulley body or sheave 23.

In the use of this device, in order to remove or replace the belt, all of the bolts 30 are removed from engagement with the hub, and a proper number screwed into the openings 31 and against the hub, so as to draw the ring 29 out of the opening 28 and clear of the web 26. By reason of the taper at 32, the ring 29 will clear the web 26 before it has passed entirely out of the opening 28, and if desired, the further movement of the ring from its place may be effected manually or otherwise, unless its fit upon the shaft 13 prevents this, in which event the full movement of the ring 29 outwardly of the plane of the outermost face of the web 26 away from the hub 20 is effected by operation of the screws 30 in the openings 31. As soon as the ring has moved this far, the screws 30 are preferably unscrewed sufficiently to draw the ends of these screws back into the ring 29. The pulley 11 is now rotated until two of the bolts 27 are in line with the axis of the shaft 14, substantially as shown in Figure 1. All of the screws 27 except the one furthest from the shaft 14 are now removed, the latter screw being loosened sufficiently to permit pivotal movement of the sheave thereon. By now rotating the two pulleys until the remaining screw 27 is on a line at right angles to a line between the two shafts, the tension of the belts will cause the sheave to move pivotally on this screw until the side of the opening 28 rests against the surface of the shaft 13. This bodily movement of the sheave toward the opposite pulley is sufficient to permit lifting of one belt from the groove of one of the pulleys so as to clear the latter and permit its removal from the other also. All of the remaining belts may be likewise removed by shifting them progressively from one groove to the next, until they may be removed from the pulleys. New belts may be put in place by adjusting each first in the outermost grooves of the two pulleys, and then shifting it successively into the others of aligned grooves until the innermost groove is reached, after which a similar operation is repeated with the second belt until it reaches the groove next to the first one, and so on, until all grooves are supplied with belts.

After all belts have been replaced while the sheave of the pulley 11 is in the eccentric position involved by its pivotal movement on a single bolt 27 as described, the pulleys are then rotated so that the single screw by which the sheave is held to the hub is returned approximately to its first position on a line with the shafts 13 and 14. This serves to draw the belt to an initial tension, and to swing the sheave back to a position nearly concentric with the shaft 13. The screws 30 are now removed from the openings 31 and inserted through the unthreaded openings 33 into engagement with the threaded holes 34 in the hub 20, being screwed into the hub so as to draw the ring 29 into the opening 28, the tapered form of the ring permitting its ready entry into the opening 28, and its progress into snug engagement against the end of the hub serving to accurately center the sheave with respect to the shaft 13, as will be appreciated.

The removed bolts 27 are now replaced (the openings in the web 26 and flange 22 having become accurately alined by the replacement of the ring 29), and all of the bolts 27 screwed home and tightened well so as to fix the sheave firmly upon the hub 20. While the ring 24 is not then required essentially for the proper operation and security of the pulley, it may be left in place as an additional support for the web 26, or may be removed for use in other like pulleys, if desired.

It will be seen that by utilizing a ring 29 of suitable radial thickness a full movement of the sheave translatively sufficient to permit clearance of a belt from the pulley flanges without injurious stretching or bruising may be effected readily.

While I have described the invention as applied to a grooved pulley, it will be appreciated that it may also be utilized in pulleys for other forms of belts where it is found advantageous, and various modifications in the construction, arrangement and combination of parts involved, as well as substitution of materials and mechanical equivalents may be carried out without departing from the spirit of the invention, except as more particularly limited by the appended claims, wherein I claim:

1. A pulley comprising a hub body constructed to be fixedly engaged directly upon a shaft or the like and having a planiform sheave supporting end face extending from and normal to the shaft, a sheave member having a concentric bore substantially larger than the shaft and having a planiform face normal to its axis in snug and radial sliding abutment with said face of the hub body, releasable means to secure the sheave rigidly against the hub, the securing means including at least one member in the hub and in the sheave adapted to form a pivotal connection between the hub and the sheave when otherwise released while in said snug abutment, a centering member concentric with the axis of the hub translatively slidable on said axis and of an external size to fit in said bore of the sheave, and concentrically disposed screw means operative between the centering member and the hub to move the centering member from and to centering engagement within the sheave.

2. A pulley consisting of a hub element having a planiform sheave supporting face normal to the axis of the pulley, a sheave body having a body part with a planiform face normal to its axis adapted to fit in snug sliding abutment against the said face of the hub, said sheave body having a concentric bore therethrough of a diameter substantially greater than the inner limits of said planiform face of the hub, means to secure the sheave body in rigid relation to the hub with said faces in abutment, said means including at least one pivot member connecting the sheave and hub, the remainder of the securing means being constructed to clear the joint between the sheave and hub when disengaged so as to permit pivotal movement of the sheave on the hub with said faces in abutment, an axially translatable centering member having fixed coaxial relation to the hub and fitted in said bore of the sheave body, and concentrically disposed means on said centering member and cooperable with the hub to move the centering member translatively alternately on said axis.

JAMES G. BRYANT, Jr.

REFERENCES CITED

The following references are of record in the file of this patent:

UNITED STATES PATENTS

| Number | Name | Date |
| --- | --- | --- |
| 1,371,212 | Adams et al. | Mar. 15, 1921 |
| 1,740,087 | Hall | Dec. 17, 1929 |
| 1,656,935 | Bahan | Jan. 24, 1928 |
| 1,421,708 | Morgan et al. | July 4, 1922 |